May 29, 1956   W. R. HARDING   2,747,254

MANUFACTURE OF SELENIUM RECTIFIERS

Filed June 14, 1952

WITNESSES:
John E. Heasley
Wm. B. Sellers

INVENTOR
William R. Harding
BY
ATTORNEY

United States Patent Office 2,747,254
Patented May 29, 1956

2,747,254
MANUFACTURE OF SELENIUM RECTIFIERS

William R. Harding, Ebenezer, N. Y., assignor to Westinghouse Electric Corporation, East Pittsburgh, Pa., a corporation of Pennsylvania Application June 14, 1952, Serial No. 293,616

5 Claims. (Cl. 29—25.3)

The present invention relates to the manufacture of selenium rectifier cells, and more particularly to the electrical forming of such rectifier cells to reduce their reverse or leakage current.

In the manufacture of selenium rectifier cells, which consist essentially of a thin layer of selenium interposed between a metal base plate and a metal counter-electrode it is necessary after completion of the cells to subject them to an electrical treatment, usually called forming, to develop the rectifying characteristics and to reduce to an acceptable value the reverse or leakage current which tends to flow through the cell in the reverse, or nominally non-conductive, direction. This electrical forming treatment consists in general of applying a voltage to the cell in excess of the normal rated voltage, causing a current flow through the cell in the reverse direction which causes the apparent resistance of the cell in the reverse direction to increase and thus reduces the leakage current to a sufficiently low value to be commercially acceptable.

Various methods of carrying out this forming treatment have been proposed. In one method which has been used, two rectifier cells are connected in series, in opposition to each other, and a voltage is applied across the two cells from a transformer which has high leakage reactance to limit the current. This method of forming, however, has the disadvantage that the voltage usually does not divide equally between the two cells, and if the reverse leakages of the cells are different, a resultant direct current will flow which may cause saturation of the transformer and is likely to result in burning out the transformer. Another forming method which has been used consists of applying a voltage across the rectifier cell with a resistance in series with the cell to limit the current. This method, however, involves very high power losses, and in order to obtain good rectifier characteristics, either the resistance or the impressed voltage must be varied during the forming cycle, which is undesirable. These methods also have a further disadvantage, since it has been found that it is necessary to limit the current through the rectifier cell to approximately 0.4 ampere per square inch at the beginning of the forming cycle, and to limit the voltage across the cell to not more than twice its rated voltage at the end of the forming cycle. Since the apparent resistance in the reverse direction varies over a very wide range during the forming, it is impractical to meet these requirements with either of the methods mentioned. It is also very desirable to maintain the losses in the cell during forming as nearly constant as possible in order to keep the cell at the correct temperature, which should not vary substantially during the forming operation.

The principal object of the present invention is to provide an improved method for electrically forming selenium rectifier cells.

Another object of the invention is to provide a method of electrically forming selenium rectifier cells which avoids the disadvantages of the methods previously used, and which makes it possible to maintain the current and voltage within the desired limits in a simple and inexpensive manner, thus producing rectifier cells of consistently high quality at a relatively low cost.

Other objects and advantages of the invention will be apparent from the following detailed description, taken in connection with the accompanying drawings, in which.

Figure 1:
Figure 1 is a transverse sectional view of a rectifier cell.
Figure 2:
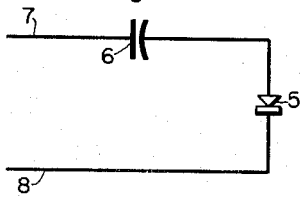
Fig. 2 is a circuit diagram showing the new forming method.

Fig. 1 shows in section the construction of a typical selenium rectifier cell to which the method of the present invention is applicable, the thicknesses of the various layers of the cell being greatly exaggerated in the drawing for clarity. In the manufacture of such a rectifier cell, a base plate 1 of aluminum, or other suitable metal, is provided and the surface of the plate 1 is preferably sandblasted and nickel-plated to obtain good adhesion of the selenium and a low-resistance contact between the selenium and the base plate. A layer 2 of selenium is then applied to the surface of the base plate 1. The selenium preferably has a small amount of bromine or other halogen dissolved in it, and may be applied to the base plate 1 in any suitable manner, as by dipping the base plate in molten selenium and spinning it to throw off the excess, so as to form a thin, uniform coating of selenium on the base plate. A barrier layer 3 of cadmium sulphide is then applied to the surface of the selenium, preferably by evaporation in vacuum, and a counter-electrode 4, which is preferably a cadmium-tin alloy, is applied by spraying. The cell is then heat-treated to convert the selenium to the conductive crystalline form.

As indicated above, the reverse or leakage current of such a cell is too high and the cell must be subjected to an electrical forming treatment, as a final step in the manufacture, in order to develop the rectifying characteristic of the cell and reduce the leakage current to a sufficiently low value. In accordance with the present invention, this treatment is carried out by connecting a rectifier cell 5 to be treated in series with a capacitor 6 and applying a substantially constant alternating voltage across the rectifier cell and capacitor, between the points 7 and 8. It has been found that a voltage of the order of 40 volts gives satisfactory results with rectifier cells having a normal voltage rating of 33 volts.

At the beginning of the forming operation, the capacitor 6 has no charge and when the polarity of the point 7 is positive, a current flows in the forward direction through the rectifier 5, the magnitude of the current being limited by the impedance of the capacitor and the relatively low resistance of the rectifier cell itself. On the next half-cycle, when the point 8 is positive, a relatively smaller current flows in the reverse direction because of the higher resistance of the rectifier cell in this direction, and this current can readily be limited to any desired value by proper choice of the capacitor 6. This smaller current leaves a charge on the capacitor 6, and when the point 7 again becomes positive on the following half-cycle, the current which flows in the forward direction is reduced by the opposing voltage of the capacitor due to its charge. When the point 8 again becomes positive, the voltage of the capacitor 6 aids the flow of current and tends to increase the current in the reverse direction through the rectifier cell, increasing the charge on the capacitor. Thus, the voltage of the capacitor slowly increases during the forming cycle, tending to decrease the forward current through the rectifier cell. This increasing voltage of the capacitor tends to increase the reverse current through the rectifier over the value it would otherwise have, although the actual reverse current flow decreases, since the apparent resistance of the rectifier in the reverse direction increases during the forming operation. The ultimate effect is that the bias voltage of the capacitor 6 increases sufficiently so that the currents in the two directions become substantially the same, and the reverse leakage current decreases to a substantially constant low value when the forming cycle is completed.

Figure 3:
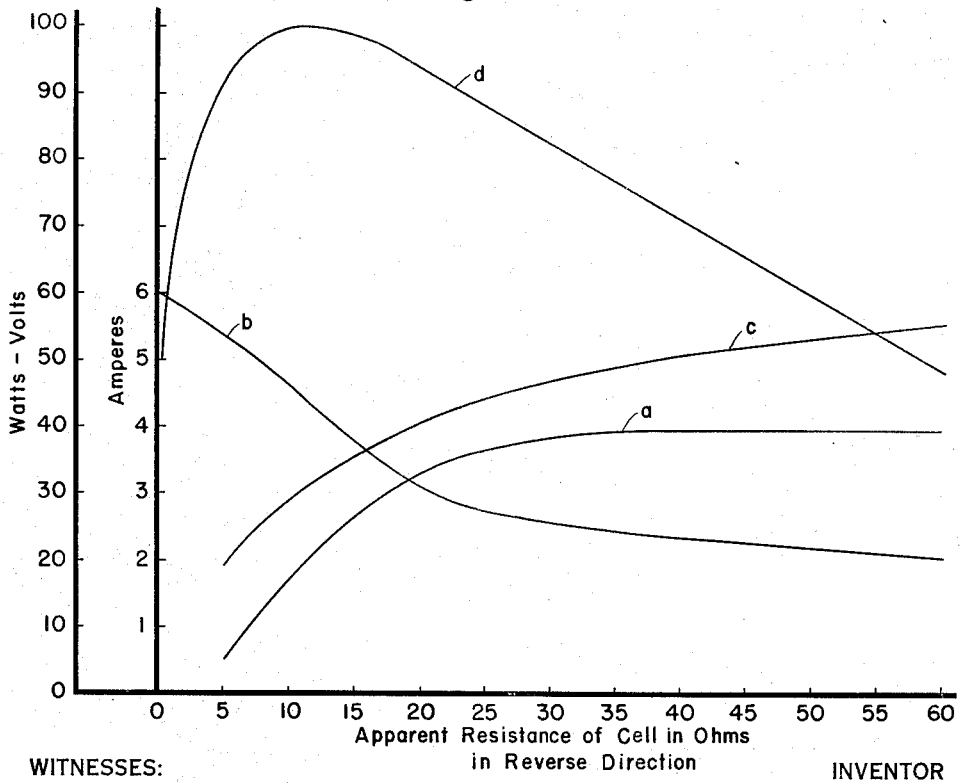
Fig. 3 is a group of curves illustrating the operation of the method.

The curves of Fig. 3 illustrate this operation. The curve $a$ shows the voltage across the capacitor 6 plotted against the apparent resistance of the rectifier cell in the reverse direction. It will be noted that the capacitor voltage gradually increases and finally becomes nearly constant. The curve $b$ shows the current in the reverse direction through the rectifier 5, which steadily decreases during the forming cycle, as the apparent resistance of the cell increases, and finally becomes substantially constant when the forming is complete. The curve $c$ shows the voltage across the rectifier cell during forming, and it will be noted that with an applied voltage of 40 volts, the voltage across the rectifier cell reaches approximately 55 volts because of the presence of the capacitor. It will be apparent that the magnitude of the voltage across the rectifier at the end of the forming cycle can be kept to any predetermined maximum value by proper choice of the capacitor 6 and thus the maximum voltage applied to the rectifier during forming can be kept within the desired limit without difficulty. The losses in the cell 5 during forming are shown by the curve $d$. As shown by this curve, the loss tends to increase in the early part of the forming operation and then decreases. This variation in the loss, however, is much less than the variations which necessarily occurred with previous methods of forming. This relatively small variation in the losses during the forming operation is an important advantage of the invention, since it tends to maintain the temperature of the rectifier cell reasonably constant, and this is an important factor in obtaining good rectifier characteristics. This method of forming has the additional advantage that if a short-circuit develops in the rectifier cell, the capacitor is discharged, burning out the short, and immediately reducing the voltage across the cell to a very low value. The forming cycle can then start over and proceed as described, if the cell is not seriously damaged.

It should now be apparent that a method of electrically forming selenium rectifier cells has been provided which has many advantages, since it is possible with this method to maintain the reverse current through the cell and the voltage across the cell within the desired limits in a simple and inexpensive manner. No variable resistances or reactance devices are required, and a constant voltage is used so that it is not necessary to have a variable voltage source. Thus, the new method is relatively inexpensive, as compared to previous forming methods, but it consistently produces rectifier cells of superior quality, because the forming cycle inherently maintains the desired voltage and current conditions. A preferred embodiment of the invention has been shown diagrammatically and described, but it is to be understood that various modifications may be made within the scope of the invention, and that the specific values given are only illustrative.

I claim as my invention:

1. A method of treating rectifier cells consisting of a layer of selenium interposed between a metal base plate and a metal counterelectrode, said method comprising applying a substantially constant alternating voltage across a rectifier cell and a capacitor in series.

2. A method of treating rectifier cells consisting of a layer of selenium interposed between a metal base plate and a metal counterelectrode, said method comprising connecting a capacitor in series with a rectifier cell and applying a substantially constant alternating voltage across the capacitor and the rectifier cell.

3. A method of electrically forming selenium rectifier cells which comprises applying a substantially constant alternating voltage across a rectifier cell in series with a capacitance.

4. A method of electrically forming selenium rectifier cells which comprises connecting a capacitor in series with a rectifier cell and applying a substantially constant alternating voltage across the rectifier cell and capacitor.

5. A method of electrically forming selenium rectifier cells which comprises connecting a capacitor in series with a rectifier cell and applying a substantially constant alternating voltage across the rectifier cell and capacitor, and maintaining said voltage until the current through the rectifier cell in the reverse direction has decreased to a substantially constant value.

References Cited in the file of this patent

UNITED STATES PATENTS

| | | |
|---|---|---|
| 2,193,610 | Wilson | Mar. 12, 1940 |
| 2,446,467 | Fry | Aug. 3, 1948 |

FOREIGN PATENTS

| | | |
|---|---|---|
| 131,203 | Australia | Jan. 29, 1946 |

OTHER REFERENCES

"Electrical Engineering," vol. 63 (1944), pages 427 and 428.